United States Patent
Kakubari et al.

(10) Patent No.: US 10,941,218 B2
(45) Date of Patent: Mar. 9, 2021

(54) METHOD FOR PRODUCING CARBOXYMETHYL CELLULOSE OR SALT THEREOF, AND BINDING AGENT FOR ELECTRODE

(71) Applicant: DAI-ICHI KOGYO SEIYAKU CO., LTD., Kyoto (JP)

(72) Inventors: Ryo Kakubari, Kyoto (JP); Atsushi Sanuki, Kyoto (JP)

(73) Assignee: DAI-ICHI KOGYO SEIYAKU CO., LTD., Kyoto (JP)

( * ) Notice: Subject to any disclaimer, the term of this patent is extended or adjusted under 35 U.S.C. 154(b) by 213 days.

(21) Appl. No.: 16/078,835

(22) PCT Filed: Feb. 16, 2017

(86) PCT No.: PCT/JP2017/005647
§ 371 (c)(1),
(2) Date: Aug. 22, 2018

(87) PCT Pub. No.: WO2017/145904
PCT Pub. Date: Aug. 31, 2017

(65) Prior Publication Data
US 2019/0055323 A1    Feb. 21, 2019

(30) Foreign Application Priority Data
Feb. 26, 2016 (JP) .............................. JP2016-035815

(51) Int. Cl.
  C08B 11/12 (2006.01)
  C08B 11/22 (2006.01)
  C08B 11/20 (2006.01)
  C08B 1/08 (2006.01)
  H01M 4/62 (2006.01)

(52) U.S. Cl.
  CPC ............... *C08B 11/12* (2013.01); *C08B 1/08* (2013.01); *C08B 11/20* (2013.01); *C08B 11/22* (2013.01); *H01M 4/62* (2013.01); *H01M 4/622* (2013.01)

(58) Field of Classification Search
None
See application file for complete search history.

(56) References Cited

U.S. PATENT DOCUMENTS

| | | | |
|---|---|---|---|
| 6,602,994 B1 | 8/2003 | Cash et al. | |
| 2005/0074669 A1 | 4/2005 | Park et al. | |
| 2011/0229760 A1 | 9/2011 | Hidaka et al. | |
| 2019/0312258 A1* | 10/2019 | Nakamura | ............ H01M 4/134 |

FOREIGN PATENT DOCUMENTS

| | | | | |
|---|---|---|---|---|
| CN | 102153663 | * | 8/2011 | ............. C08B 11/12 |
| IN | 190599 | * | 8/2003 | ............... C08B 3/16 |
| JP | 62-96501 A | | 5/1987 | |
| JP | 6-55761 B2 | | 10/1987 | |
| JP | 2002-536507 A | | 10/2002 | |
| JP | 2005-108833 A | | 4/2005 | |
| JP | 2013-114959 A | | 6/2013 | |
| WO | WO 2010/061871 A1 | | 6/2010 | |

OTHER PUBLICATIONS

Akerlof et al., "The Density of Aqueous Solutions of Sodium Hydroxide" Journal of The American Chemical Society vol. 61 pp. 1027-1032 (Year: 1939).*
English machine translation of CN102153663 above, downloaded from worldwide.espacenet.com (Year: 2011).*
International Search Report dated May 23, 2017, in PCT/JP2017/005647 filed Feb. 16, 2017.

* cited by examiner

*Primary Examiner* — Eric Olson
(74) *Attorney, Agent, or Firm* — Oblon, McClelland, Maier & Neustadt, L.L.P.

(57) ABSTRACT

Provided is a carboxymethyl cellulose or a salt thereof, in which when the carboxymethyl cellulose or the salt thereof is used as a binding agent for an electrode of a nonaqueous electrolyte secondary battery, defects, such as pinholes, on a surface of the electrode are reduced and a battery including the electrode has a good capacity retention. A method for producing a carboxymethyl cellulose or a salt thereof includes an alkali cellulose formation step (step 1) of allowing cellulose and an alkali to react with each other in the presence of a mixed solvent containing water and an organic solvent, an etherification step (step 2) of allowing the resulting alkali cellulose and an etherifying agent to react with each other, a purification step (step 3) of washing and drying the resulting reaction mixture, and a pulverization step (step 4) of pulverizing the resulting purified product. In the method, the step 1 is conducted for a reaction time of 60 minutes or more and 120 minutes or less under conditions of a pH of 9 or more and a reaction temperature of 5° C. or higher and 25° C. or lower.

7 Claims, No Drawings

METHOD FOR PRODUCING CARBOXYMETHYL CELLULOSE OR SALT THEREOF, AND BINDING AGENT FOR ELECTRODE

TECHNICAL FIELD

The present invention relates to a method for producing a carboxymethyl cellulose or a salt thereof, and a binding agent for an electrode.

BACKGROUND ART

Nonaqueous electrolyte secondary batteries (such as lithium secondary batteries), which have high energy densities and high capacities, are widely used in portable devices and the like. Electrodes of such nonaqueous electrolyte secondary batteries are obtained by applying a slurry (or a paste) containing an active material and a binding agent onto a current collector substrate and drying the slurry (or the paste). The properties of the electrodes significantly depend on the type of the binding agent.

It is known that a carboxymethyl cellulose or a salt thereof is used as the binding agent. For example, PTL 1 discloses that a carboxymethyl cellulose or a salt thereof obtained by further pulverizing and classifying a commercially available carboxymethyl cellulose or a salt thereof is used as a binding agent of an electrode, and pinholes and the like on the electrode can be thereby prevented.

In general, a carboxymethyl cellulose or a salt thereof is produced by conducting alkali cellulose formation reaction in which an alkali is allowed to react with cellulose, and subsequently adding an etherifying agent to the resulting alkali cellulose to conduct etherification reaction. An example of a known production method includes conducting alkali cellulose formation reaction by using a mixed solvent containing water and an organic solvent, subsequently adding monochloroacetic acid to conduct etherification reaction, subsequently neutralizing an excessive alkali with an acid, subsequently removing the mixed solvent, conducting washing and drying, and pulverizing the resulting product (refer to, for example, PTL 2).

CITATION LIST

Patent Literature

PTL 1: Japanese Patent No. 5514734
PTL 2: Japanese Unexamined Patent Application Publication No. 2009-191233

SUMMARY OF INVENTION

Technical Problem

It was found that when the carboxymethyl cellulose disclosed in PTL 1 was used as a binding agent of an electrode, a battery including the electrode had a poor capacity retention, though defects, such as pinholes, on a surface of the electrode could be reduced.

An object of embodiments of the present invention is to provide a carboxymethyl cellulose or a salt thereof, in which when the carboxymethyl cellulose or the salt thereof is used as, for example, a binding agent for an electrode of a nonaqueous electrolyte secondary battery, defects, such as pinholes, on a surface of the electrode are reduced and a battery including the electrode has a good capacity retention.

Solution to Problem

A first embodiment of the present invention is a method for producing a carboxymethyl cellulose or a salt thereof, the method including an alkali cellulose formation step (step 1) of allowing cellulose and an alkali to react with each other in the presence of a mixed solvent containing water and an organic solvent, an etherification step (step 2) of allowing an alkali cellulose obtained in the step 1 and an etherifying agent to react with each other, a purification step (step 3) of washing and drying a reaction mixture obtained in the step 2, and a pulverization step (step 4) of pulverizing a purified product obtained in the step 3. In the method, the step 1 is conducted for a reaction time of 60 minutes or more and 120 minutes or less under conditions of a pH of 9 or more and a reaction temperature of 5° C. or higher and 25° C. or lower.

A second embodiment of the present invention is a binding agent for an electrode, the binding agent including a carboxymethyl cellulose or a salt thereof, the carboxymethyl cellulose or salt satisfying (1) and (2) below:

(1) a 1 mass % aqueous solution has a viscosity (at 25° C.) of 5,000 mPa·s or more and 20,000 mPa·s or less, and (2) a dry mass of a residue after a 0.05 mass % aqueous solution is filtered through a 200-mesh polyester screen under a reduced pressure condition of −13.3 kPa is 0.100% by mass or less of a dry mass of the carboxymethyl cellulose used or the salt thereof used.

A third embodiment of the present invention is an electrode including the binding agent for an electrode. A fourth embodiment of the present invention is a battery including the electrode.

Advantageous Effects of Invention

According to the embodiments, when the carboxymethyl cellulose or the salt thereof is used as, for example, a binding agent for an electrode of a nonaqueous electrolyte secondary battery, defects, such as pinholes, on a surface of the electrode are reduced, and the capacity retention of a battery including the electrode can be improved.

DESCRIPTION OF EMBODIMENTS

Hereinafter, embodiments of the present invention will be described in detail.

A method for producing a carboxymethyl cellulose or a salt thereof according to an embodiment includes steps 1 to 4 below.

Step 1: An alkali cellulose formation step of allowing cellulose and an alkali to react with each other in the presence of a mixed solvent containing water and an organic solvent.

Step 2: An etherification step of allowing an alkali cellulose obtained in the step 1 and an etherifying agent to react with each other.

Step 3: A purification step of washing and drying a reaction mixture obtained in the step 2.

Step 4: A pulverization step of pulverizing a purified product obtained in the step 3.

Hereinafter, each of the steps will be described in detail.

[Step 1: Alkali Cellulose Formation Step]

Cellulose:

Examples of cellulose include, but are not particularly limited to, ground pulp, wood pulp, cotton linter pulp, and waste paper pulp. These cellulose raw materials may be used alone or in combination of two or more thereof.

Alkali:

Examples of the alkali include alkali metal hydroxides such as lithium hydroxide, sodium hydroxide, and potassium hydroxide. These alkali metal hydroxides may be used alone or in combination of two or more thereof. In an embodiment, the amount of alkali used is preferably 0.5 moles or more and 2.5 moles or less, and more preferably 0.8 moles or more and 1.8 moles or less relative to 100 g of cellulose.

Mixed Solvent:

A mixed solvent containing water and an organic solvent is used as a solvent when alkali cellulose formation reaction is conducted. The content of water relative to 100 parts by mass of the organic solvent is not particularly limited but is preferably 20 parts by mass or more and 60 parts by mass or less. Within the above range, the uniformity of the alkali cellulose formation reaction with the alkali dissolved in water can be enhanced to further reduce defects, such as pinholes, on a surface of an electrode, and the capacity retention of a battery including the electrode and the capacity of the battery at high output can be further improved. The lower limit of the content of water is more preferably 25 parts by mass or more, and still more preferably 30 parts by mass or more. The upper limit of the content of water is more preferably 50 parts by mass or less.

Organic Solvent:

Examples of the organic solvent include alcohol solvents such as ethyl alcohol, methyl alcohol, n-propyl alcohol, isopropyl alcohol, n-butyl alcohol, and isobutyl alcohol; ketone solvents such as acetone, diethyl ketone, and methyl ethyl ketone; dioxane; and diethyl ether. These organic solvents may be used alone or as a mixture of two or more thereof. Among these, monohydric alcohols having 1 to 4 carbon atoms are preferred, and monohydric alcohols having 1 to 3 carbon atoms are more preferred because they have good compatibility with water.

The content of the organic solvent is preferably 20% to 70% by mass, and more preferably 30% to 60% by mass of the reaction liquid (the whole reaction liquid containing cellulose, an alkali, and a mixed solvent).

Ratio of Alkali to Water:

The amount of the alkali is preferably 0.8 moles or more and 1.5 moles or less relative to 100 g of water. Within the above range, the uniformity of the alkali cellulose formation reaction can be enhanced to further reduce defects, such as pinholes, on a surface of an electrode, and the capacity retention of a battery including the electrode and the capacity of the battery at high output can be further improved. The lower limit of the content of the alkali relative to 100 g of water is more preferably 0.9 moles or more, and still more preferably 1.0 mole or more. The upper limit of the content of the alkali relative to 100 g of water is more preferably 1.4 moles or less, and still more preferably 1.3 moles or less.

Ratio of Organic Solvent to Cellulose:

The organic solvent is preferably used in an amount of 250 parts by mass or more and 1,000 parts by mass or less relative to 100 parts by mass of cellulose. Within the above range, defects, such as pinholes, on a surface of an electrode can be further reduced. The lower limit of the content of the organic solvent is more preferably 350 parts by mass or more. The upper limit of the content of the organic solvent is more preferably 700 parts by mass or less.

Conditions for Alkali Cellulose Formation Reaction:

In this embodiment, the alkali cellulose formation reaction is conducted for a reaction time of 60 minutes or more and 120 minutes or less under the conditions of a pH of 9 or more and a reaction temperature of 5° C. or higher and 25° C. or lower. When the alkali cellulose formation reaction is conducted under a low-temperature condition for a relatively long time in this manner, the uniformity of the reaction can be enhanced to suppress the generation of water-insoluble microgel while a decrease in the molecular weight of cellulose is suppressed. Therefore, in the finally obtained carboxymethyl cellulose or a salt thereof, the generation of microgel can be suppressed to reduce defects on a surface of an electrode while a high viscosity of an aqueous solution is maintained. Consequently, the effect of reducing defects on a surface of an electrode can be exerted while the battery performance such as the capacity retention of a battery and the capacity of the battery at high output is enhanced.

The pH is 9 or more as described above, and the alkali cellulose formation reaction can be thereby allowed to proceed. The pH is more preferably 11 or more, still more preferably 12 or more, and may be 13 or more. The upper limit of the pH is not particularly limited.

The reaction temperature is 5° C. or higher and 25° C. or lower as described above. The lower limit of the reaction temperature is more preferably 10° C. or higher. The upper limit of the reaction temperature is more preferably 23° C. or lower, and still more preferably 20° C. or lower.

The reaction time is 60 minutes or more and 120 minutes or less as described above. The lower limit of the reaction time is more preferably 70 minutes or more, and still more preferably 80 minutes or more. The upper limit of the reaction time is more preferably 110 minutes or less, and still more preferably 100 minutes or less.

The alkali cellulose formation step can be conducted by using a reactor capable of mixing and stirring the above components while controlling the temperature. Various reactors that have hitherto been used for alkali cellulose formation reaction can be used.

[Step 2: Etherification Step]

Etherifying Agent:

After the alkali cellulose formation reaction, etherification reaction is conducted by adding an etherifying agent to complete carboxymethylation reaction. Examples of the etherifying agent include monochloroacetic acid, sodium monochloroacetate, methyl monochloroacetate, ethyl monochloroacetate, and isopropyl monochloroacetate.

Ratio of Etherifying Agent to Cellulose:

The etherifying agent is preferably used in an amount of 0.5 moles or more and 1.5 moles or less relative to 1 mole of the glucose unit (anhydrous glucose unit) of cellulose. Within the above range, defects, such as pinholes, on a surface of an electrode can be further reduced. The lower limit of the ratio of the etherifying agent relative to 1 mole of the glucose unit of cellulose is more preferably 0.6 moles or more, and still more preferably 0.7 moles or more. The upper limit of the ratio is preferably 1.3 moles or less, and still more preferably 1.1 moles or less.

Conditions for Etherification:

Preferably, mixing of the liquid containing the alkali cellulose and the etherifying agent is performed a plurality of times in a separate manner or performed by dropwise addition in order to prevent the temperature of the reaction mixture from increasing. The temperature of the reaction mixture during mixing is preferably 30° C. or higher and 80° C. or lower.

The reaction temperature after completion of the mixing is not particularly limited but is preferably 60° C. or higher and 100° C. or lower. Within the above range, defects, such as pinholes, on a surface of an electrode can be further reduced. The lower limit of the reaction temperature is preferably 70° C. or higher. The upper limit of the reaction temperature is preferably 90° C. or lower.

The reaction time is not particularly limited but is preferably 10 minutes or more and 90 minutes or less. Within the above range, defects, such as pinholes, on a surface of an electrode can be further reduced. The lower limit of the reaction time is more preferably 20 or more. The upper limit of the reaction time is more preferably 80 minutes or less.

The etherification step may be conducted by using the reactor used in the alkali cellulose formation reaction. Alternatively, the etherification step may be conducted by using another reactor capable of mixing and stirring the above components while controlling the temperature.

[Step 3: Purification step]

The purification step is a step of washing and drying the reaction mixture obtained in the step 2 described above. In an embodiment, the purification step may include a solvent removal step, a washing step, and a drying step. The purification step may further include a pH adjustment step prior to the solvent removal step.

In an embodiment, the purification step may be a step of, after completion of the etherification reaction, preparing a reaction mixture having a pH of 9 or more and 11 or less, removing the mixed solvent from the reaction mixture, and subsequently conducting washing and drying. By maintaining the reaction mixture in an alkaline region after completion of the etherification reaction in this manner, aggregation of a carboxymethyl cellulose or a salt thereof can be suppressed to suppress generation of water-insoluble microgel. Furthermore, in this embodiment, a decrease in the molecular weight of a carboxymethyl cellulose or a salt thereof is suppressed by conducting the alkali cellulose formation under mild reaction conditions as described above. Accordingly, even when the reaction mixture is maintained in an alkaline region and the molecular weight is consequently decreased by depolymerization, a high molecular weight can be maintained compared with the related art. Therefore, it is possible to enhance the operation and effect that the generation of microgel is suppressed while a high viscosity of an aqueous solution is maintained. The lower limit of the pH of the reaction mixture is more preferably 9.5 or more.

pH Adjustment Step:

The pH adjustment step is a step of adjusting the pH of the reaction mixture to 9 or more and 11 or less by adding an acid after completion of the etherification reaction. Thus, the alkali that remains excessively is partially neutralized with the acid. The pH adjustment step is basically performed when the pH of the reaction mixture after completion of the etherification reaction is higher than the above range. However, the pH adjustment step may be performed when the pH of the reaction mixture after completion of the etherification reaction is within the above range (for example, when the pH is slightly lower than 11, the pH may be adjusted to about 9.5). After completion of the etherification reaction, the reaction mixture may be cooled to a temperature of, for example, 60° C. or lower.

The acid may be, for example, an organic acid such as formic acid, acetic acid, propionic acid, malic acid, citric acid, or sulfamic acid or an inorganic acid such as hydrochloric acid, nitric acid, or sulfuric acid.

Solvent Removal Step:

The solvent removal step is a step of removing the mixed solvent containing water and an organic solvent by, for example, filtration, distillation under reduced pressure, or a combination thereof. The content of the mixed solvent in the reaction mixture after the solvent removal is not particularly limited and may be, for example, 70% by mass or less and 60% by mass or less. Alternatively, the mixed solvent may be removed by using a kneader or the like until the content of the mixed solvent becomes 5% by mass or less.

Note that an alkali may be added to the reaction mixture after the solvent removal (hereinafter, referred to as "crude carboxymethyl cellulose salt") to thereby adjust the pH of the reaction mixture to 9 or more and 11 or less (more preferably 9.5 or more and 11 or less). In this case, the same alkali as the alkali used in the step 1 can be used as the alkali.

Washing Step:

In the washing step, a mixed solvent of water and an organic solvent can be used. The crude carboxymethyl cellulose salt is washed with the mixed solvent. The same mixed solvent as the mixed solvent used in the step 1 can be used. The organic solvent is more preferably a monohydric alcohol having 1 to 4 carbon atoms.

Drying Step:

The drying step is a step of drying the washed crude carboxymethyl cellulose salt. Examples of the drying method include air drying, heat drying, drying under reduced pressure, and heat drying under reduced pressure.

[Step 4: Pulverization Step]

The pulverization step is a step of pulverizing the purified product obtained in the step 3 described above. For the pulverization, a dry pulverizer may be used. Alternatively, a wet pulverizer may be used. In the pulverization step, various pulverizers described below may be used alone. Alternatively, a pulverization process including two or more steps may be performed by using two or more of the pulverizers in combination. Furthermore, a pulverization process including two or more steps may be performed by using a single type of pulverizer.

Examples of the dry pulverizer include cutting mills, impact mills, airflow mills, and media mills.

Examples of the cutting mills include a mesh mill (available from HORAI Co., Ltd.), an Atoms, (available from YAMAMOTO HYAKUMA MFG. Co., Ltd.), a knife mill (available from PALLMANN Industries, Inc.), a granulator (available from Herbold), and a rotary cutter mill (available from Nara Machinery Co., Ltd.).

Examples of the impact mills include a Pulverizer, a Fine Impact Mill, and a Super Micron Mill (all of which are available from Hosokawa Micron Corporation), a sample mill, a bantam mill, and an atomizer (all of which are available from Seishin Enterprise Co., Ltd.), a tornado mill (available from Nikkiso Co., Ltd.), a turbo mill (available from Freund-Turbo Corporation), and a bevel impactor (available from Aikawa Iron Works Co., Ltd.).

Examples of the airflow mills include a CGS-type jet mill (available from Mitsui Mining Co., Ltd.), a jet mill (available from Sansho Industry Co., Ltd.), an Ebara jet micronizer (available from Ebara Corporation), a Ceren-Miller (available from Masuko Sangyo Co., Ltd.), and a supersonic jet mill (available from Nippon Pneumatic Mfg. Co., Ltd.).

Examples of the media mills include a vibration ball mill.

Examples of the wet pulverizer include a masscolloider (available from Masuko Sangyo Co., Ltd.), a high-pressure homogenizer (available from Sanmaru Machinery Co., Ltd.) and a bead mill (available from Aimex Co., Ltd.).

The carboxymethyl cellulose or the salt thereof after pulverization may be further subjected to a classification process. Examples of the method of the classification process include a method using a sieve and a method using a classifier such as a cyclone classifier. In the case where the pulverization process including two or more steps is performed as described above, the classification process may be performed after each of the steps of the pulverization process.

Thus, a carboxymethyl cellulose or a salt thereof according to this embodiment is obtained. The carboxymethyl cellulose or the salt thereof has a structure in which hydroxyl groups in the glucose residues constituting cellulose are replaced by carboxymethyl ether groups. The carboxymethyl cellulose or the salt thereof may have a form having a carboxyl group, a form of a metal carboxylate such as a sodium salt, or both the form having a carboxyl group and the form of a metal carboxylate. Examples of the metal salt include alkali metal salts such as a sodium salt, a lithium salt, and a potassium salt. In an embodiment, the carboxymethyl cellulose or the salt thereof can be used as a binding agent for electrodes of nonaqueous electrolyte secondary batteries.

[Binding Agent for Electrode]

A binding agent for an electrode according to this embodiment includes a carboxymethyl cellulose or a salt thereof, the carboxymethyl cellulose or salt satisfying (1) and (2) below.

(1) A 1 mass % aqueous solution has a viscosity (at 25° C.) of 5,000 mPa·s or more and 20,000 mPa·s or less.

(2) A dry mass of a residue after a 0.05 mass % aqueous solution is filtered through a 200-mesh polyester screen under a reduced pressure condition of −13.3 kPa is 0.100% by mass or less of a dry mass of the carboxymethyl cellulose used or the salt thereof used.

Such a carboxymethyl cellulose or a salt thereof can be prepared by, for example, the production method according to the embodiment described above.

Regarding the condition (2) above, when the dry mass of the residue after the filtration is 0.100% by mass or less of the original dry mass, defects, such as pinholes, on a surface of an electrode can be further reduced. The dry mass of the residue is preferably 0.080% by mass or less, and more preferably 0.050% by mass or less. The lower limit is not particularly limited but may be, for example, 0.0001% by mass or more.

In addition to the condition (2) above, as described in the condition (1) above, the viscosity (at 25° C.) of the 1 mass % aqueous solution of the carboxymethyl cellulose or the salt thereof is set to 5,000 mPa·s or more and 20,000 mPa·s or less. As a result, defects, such as pinholes, on a surface of an electrode are reduced, and a capacity retention of a battery including the electrode and a capacity of the battery at high output can be enhanced. The lower limit of the viscosity of the 1 mass % aqueous solution is preferably 5,500 mPa·s or more, and more preferably 6,000 mPa·s or more. The upper limit of the viscosity is preferably 15,000 mPa·s or less, more preferably 12,000 mPa·s or less, and still more preferably 10,000 mPa·s or less and may be 8,000 mPa·s or less.

The carboxymethyl cellulose or the salt thereof preferably has a degree of etherification of 0.5 or more and 0.9 or less. Within this range, defects, such as pinholes, on a surface of an electrode can be further reduced, and a capacity retention of a battery including the electrode and a capacity of the battery at high output can be further enhanced. The lower limit of the average degree of etherification is preferably 0.6 or more, and the upper limit of the average degree of etherification is 0.8 or less.

The carboxymethyl cellulose or the salt thereof preferably has an average particle size (volume-cumulative 50% particle size) of 5 μm or more and 100 μm or less. Within this range, defects, such as pinholes, on a surface of an electrode can be further reduced, and a capacity retention of a battery including the electrode and a capacity of the battery at high output can be further enhanced. The lower limit of the average particle size is more preferably 10 μm or more. The upper limit of the average particle size is more preferably 70 μm or less, still more preferably 50 μm or less, and particularly preferably 30 μm or less.

[Electrode]

An electrode according to this embodiment is one obtained by using the above-described binding agent for an electrode. An electrode for a nonaqueous electrolyte secondary battery according to an embodiment is formed by preparing a slurry-like or paste-like composition for an electrode, the composition being prepared by either dry-mixing the binding agent and an active material, subsequently adding water and a binder, and mixing the resulting mixture or dissolving the binding agent in water, subsequently adding an active material and a binder, and mixing the resulting mixture; and applying the resulting composition for an electrode to a current collector.

The content of the carboxymethyl cellulose or the salt thereof in the composition for an electrode may be, for example, 0.1% to 4.0% by mass in terms of solid content.

The active material is not particularly limited. Examples of a negative electrode active material include graphite materials such as graphite, coke, and carbon fibers; elements, such as Al and Si, capable of forming an alloy with lithium or compounds that contain the elements; composite materials of any of the elements or compounds and carbon and/or any of the graphite materials; and nitrides containing lithium. Examples of a positive electrode active material include $LiMe_xO_y$-based positive electrode active materials (where Me represents a transition metal containing at least one of Ni, Co, and Mn, and x and y each represent any number). Note that the composition for an electrode may contain a conductive material such as carbon black.

The binder is also not particularly limited. Examples of the binder for a negative electrode include synthetic-rubber bonding agents such as styrene-butadiene rubber (SBR). Examples of the binder for a positive electrode include, besides the synthetic-rubber bonding agents, polytetrafluoroethylene.

The current collector is also not particularly limited. Examples of the current collector for a negative electrode include stainless steel, nickel, and copper. Examples of the current collector for a positive electrode include aluminum and stainless. The method for applying the composition for an electrode to the current collector is also not particularly limited. For example, known methods using a roll coater, an air knife coater, a blade coater, or the like can be employed.

[Battery]

A battery according to this embodiment includes the electrode described above. An example of the battery is a nonaqueous electrolyte secondary battery. A nonaqueous electrolyte secondary battery according to an embodiment may have any structure and may include, for example, a positive electrode, a negative electrode, a separator, and a nonaqueous electrolyte. The electrode according to the embodiment described above is used as at least one of the positive electrode and the negative electrode. In an embodiment, the battery may include a stacked body in which positive electrodes and negative electrodes are alternately stacked with separators therebetween, a container that houses the stacked body, and a nonaqueous electrolyte, such as an electrolyte solution, injected in the container.

EXAMPLES

Hereinafter, the present invention will be described in more detail by way of Examples. The present invention is not limited to the Examples.

[Measuring Methods]

Methods for measuring physical properties are those described below.

(1) Water Content

A carboxymethyl cellulose or a salt thereof was precisely weighed. The carboxymethyl cellulose or the salt thereof was dried at 105° C. for four hours and further cooled to 25° C. in a desiccator, and the mass thereof was measured. A rate of decrease was calculated from the masses before and after the drying and defined as a water content (% by mass).

(2) Degree of Etherification

A carboxymethyl cellulose or a salt thereof (0.6 g) was dried at 105° C. for four hours. The mass of the resulting dried product was precisely weighed. Subsequently, the dried product was wrapped with filter paper and incinerated in a porcelain crucible. The incinerated product was transferred to a 500-mL beaker. Subsequently, 250 mL of water and 35 mL of a 0.05 mol/L aqueous solution of sulfuric acid were added to the beaker, and the resulting mixture was boiled for 30 minutes. After cooling, the excessive acid was back-titrated with a 0.1 mol/L aqueous solution of potassium hydroxide. Phenolphthalein was used as an indicator. The degree of etherification was calculated from the formula below by using the measurement results.

Formula: (Degree of etherification)=162×$A$/(10000−80$A$) $A$=($af$−$bf^1$)/weight of dried product (g)

A: amount (mL) of 0.05 mol/L aqueous solution of sulfuric acid consumed by bonded alkali in 1 g of sample
  a: amount (mL) of 0.05 mol/L aqueous solution of sulfuric acid used
  f: titer of 0.05 mol/L aqueous solution of sulfuric acid
  b: amount (mL) of titration of 0.1 mol/L aqueous solution of potassium hydroxide
  $f^1$: titer of 0.1 mol/L aqueous solution of potassium hydroxide (3) Viscosity of 1 mass % aqueous solution A carboxymethyl cellulose or a salt thereof (about 2.2 g) was put in a 300-mL conical flask with a ground-in stopper, and the weight thereof was precisely weighed. Water was added to the flask in an amount calculated by a mathematical expression "sample (g)×(99−water content (% by mass))". The flask was allowed to stand for 12 hours, and mixing was further conducted for five minutes. A viscosity at 25° C. was measured by using the resulting solution in accordance with JIS Z8803 with a BM-type viscometer (single cylinder-type rotational viscometer). Here, (a) the measurement was conducted at a number of revolutions of a rotor of 60 rpm. (b) When the measurement value in (a) above was 8,000 mPa·s or more, the number of revolutions of the rotor was changed to 30 rpm, and the measurement was conducted. (c) When the measurement value in (b) above was 16,000 mPa·s or more, the number of revolutions of the rotor was changed to 12 rpm, and the measurement was conducted.

(4) Average Particle Size

The measurement was conducted by using isopropyl alcohol as a dispersion medium with a laser diffraction particle size distribution analyzer (Mastersizer 2000 available from Malvern Panalytical Ltd.). The value of a volume-cumulative 50% particle size was defined as an average particle size (μm).

(5) Amount of Microgel

One liter of a 0.05 mass % (% by mass based on a dry mass of a carboxymethyl cellulose or a salt thereof) aqueous solution of a carboxymethyl cellulose or a salt thereof was prepared. The one liter of aqueous solution was filtered through a 200-mesh polyester screen (opening: 75 μm) under a reduced pressure condition of −13.3 kPa. Subsequently, the screen including a residue was dried at 105° C. for two hours and precisely weighed. The dry mass of the residue was calculated by using a mass of the screen before use, the mass being precisely weighed in advance. A ratio of the dry mass of the residue (amount of microgel) (% by mass) relative to the dry mass of the carboxymethyl cellulose used or the salt thereof used was calculated from the dry mass of the residue determined above.

[Production of Carboxymethyl Cellulose Salt]

Example 1

In a biaxial kneader-type reactor, 2,318 g of a solvent (isopropyl alcohol/water=80/20 (mass ratio)), 589 g of a 53 mass % aqueous solution of sodium hydroxide, and 450 g of chip-like cellulose (linter pulp: PCS2500 available from Shandong Gaomi Silver Hawk Chemical Fibre Imp & Exp Co., Ltd., China) were fed, and alkali cellulose formation reaction was conducted at 20° C. for 90 minutes. During the reaction, the pH was 14.47 (measured with a pH meter having a glass electrode, hereinafter the same).

Subsequently, a mixture of 244 g of monochloroacetic acid and 80 g of a solvent (isopropyl alcohol/water=80/20 (mass ratio)) whose temperature was adjusted to 25° C. was added dropwise to the resulting reaction liquid over a period of 60 minutes (the temperature was maintained at 30° C. to 40° C. during the dropwise addition). The temperature was then increased to 78° C. over a period of 25 minutes, and etherification reaction was further conducted for 70 minutes.

The resulting reaction solution was then cooled to 60° C., and the pH thereof was adjusted to 9.5 by using a 50 mass % aqueous solution of acetic acid. The reaction solvent was then recovered by evaporation using a vacuum filtration device. Thus, a crude carboxymethyl cellulose sodium salt (non-volatile content: 40% by mass) was obtained.

Sodium hydroxide was added to the resulting crude carboxymethyl cellulose sodium salt to adjust the pH to 9.5. Subsequently, the crude carboxymethyl cellulose sodium salt was washed with a solvent (methanol/water=70/30 (mass ratio)) in an amount 10 times the mass of the crude carboxymethyl cellulose sodium salt and then dried at 105° C. for 45 minutes. The resulting dried product was pulverized with an impact mill (Pulverizer, available from Hosokawa Micron Corporation) and classified with an 80-mesh standard sieve. The resulting pulverized product was further pulverized with the impact mill and classified with a 440-mesh standard sieve to obtain a carboxymethyl cellulose sodium salt.

Example 2

A carboxymethyl cellulose sodium salt was obtained by performing the same operation as in Example 1 except that the alkali cellulose formation reaction was conducted at 10° C. for 120 minutes.

Example 3

A carboxymethyl cellulose sodium salt was obtained by performing the same operation as in Example 1 except that after completion of the etherification reaction, the pH of the reaction solution was adjusted to 11 by using a 50 mass % aqueous solution of acetic acid.

Example 4

A carboxymethyl cellulose sodium salt was obtained by performing the same operation as in Example 1 except that the reaction time of the alkali cellulose formation reaction was changed to 70 minutes.

Example 5

A carboxymethyl cellulose sodium salt was obtained by performing the same operation as in Example 1 except that the alkali cellulose formation reaction was conducted at 23° C. for 80 minutes.

Comparative Example 1

A carboxymethyl cellulose sodium salt was obtained by performing the same operation as in Example 1 except that the alkali cellulose formation reaction was conducted at a reaction temperature of 40° C. for a reaction time of 30 minutes, and after completion of the etherification reaction, the pH was adjusted to 8 at the time of the neutralization using a 50 mass % aqueous solution of acetic acid.

Comparative Example 2

A commercially available carboxymethyl cellulose sodium salt (viscosity of 1 mass % aqueous solution at 25° C.: 3,500 mPa·s, the degree of etherification: 0.76) was subjected to a dry pulverization process with an airflow mill. The resulting pulverized product was subjected to a classification process by using an 80-mesh standard sieve. Thus, a carboxymethyl cellulose sodium salt was obtained.

Comparative Example 3

A carboxymethyl cellulose sodium salt was obtained by performing the same operation as in Example 1 except that the reaction time of the alkali cellulose formation reaction was changed to 50 minutes.

Comparative Example 4

A commercially available carboxymethyl cellulose sodium salt (viscosity of 1 mass % aqueous solution at 25° C.: 8,000 mPa·s, the degree of etherification: 0.69) was subjected to a dry pulverization process with an airflow mill. The resulting pulverized product was subjected to a classification process by using an 80-mesh standard sieve. Thus, a carboxymethyl cellulose sodium salt was obtained.

Table 1 below shows the analysis and measurement results of the carboxymethyl cellulose salts obtained as described above. As shown in Table 1, in Examples 1 to 5, in which the alkali cellulose formation reaction was conducted under the specified conditions as described above, the generation of microgel could be suppressed while a high viscosity of the 1 mass % aqueous solution was maintained. In contrast, in Comparative Example 1, in which the alkali cellulose formation reaction was conducted at a relatively high temperature, not only was the viscosity of the 1 mass % aqueous solution lower than the specified value, but also the amount of microgel was large. In Comparative Example 3, in which the alkali cellulose formation reaction was conducted at a low temperature but the reaction time was short, the amount of microgel was large, though a high viscosity of the 1 mass % aqueous solution could be maintained. On the other hand, regarding the samples obtained by pulverizing commercially available carboxymethyl cellulose, in Comparative Example 2, the viscosity of the 1 mass % aqueous solution was low, though the generation of microgel could be suppressed, and in Comparative Example 4, the amount of microgel was large, though a high viscosity of the 1 mass % aqueous solution could be maintained.

TABLE 1

|  | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| Water content (mass %) | 6.5 | 6.7 | 4.6 | 7.1 | 6.6 | 6.3 | 6.9 | 7.6 | 7.3 |
| Degree of etherification | 0.70 | 0.69 | 0.70 | 0.68 | 0.70 | 0.71 | 0.76 | 0.67 | 0.69 |
| Viscosity of 1 mass % aqueous solution (mPa·s/25° C.) | 7150 | 7180 | 6480 | 7520 | 6370 | 4780 | 2400 | 7500 | 6000 |
| Average particle size (μm) | 23 | 23 | 22 | 25 | 22 | 22 | 15 | 23 | 23 |
| Amount of microgel (mass %) | 0.018 | 0.021 | 0.014 | 0.044 | 0.038 | 0.240 | 0.023 | 0.140 | 0.260 |

[Preparation of Electrodes]

(Negative Electrodes 1 to 9)

In a planetary mixer, 100 g of spherical natural graphite, 0.5 g of carbon black (available from Timcal, Super-P), and 1 g of the carboxymethyl cellulose or the salt thereof shown in Table 2 were mixed. To the resulting mixture, 101.5 g of water and 1 g of a 50 wt % water dispersion of styrene-butadiene rubber (SBR) were added, and mixing was performed to prepare a slurry having a solid content of 50% by mass. The slurry was applied onto an electrolytic copper foil with a coater such that the amount of the spherical natural graphite was 8 mg/cm$^2$ and dried at 120° C. Subsequently, the resulting electrolytic copper foil was subjected to roll-pressing to prepare negative electrodes 1 to 9.

(Positive Electrode 1)

In a planetary mixer, 100 g of LiNi$_{1/3}$Mn$_{1/3}$Co$_{1/3}$O$_2$ (LNMCO), 7.8 g of carbon black (available from Timcal, Super-P), 6 g of polyvinylidene fluoride, and 61.3 g of N-methyl-2-pyrrolidone were mixed to prepare a slurry having a solid content of 65% by mass. The slurry was applied onto an aluminum foil with a coater such that the amount of LNMCO was 13.8 mg/cm$^2$ and dried at 130° C. Subsequently, the resulting aluminum foil was subjected to roll-pressing to prepare a positive electrode 1.

(Positive Electrode 2)

In a planetary mixer, 200 g of LiMn$_2$O$_4$, 12 g of carbon black (available from Timcal, Super-P), and 2 g of the carboxymethyl cellulose salt of Example 1 were mixed. To the resulting mixture, 113 g of water and 8 g of a 50 wt % water dispersion of styrene-butadiene rubber (SBR) were added, and mixing was performed to prepare a slurry having a solid content of 65% by mass. The slurry was applied onto an aluminum foil with a coater such that the amount of LiMn$_2$O$_4$ was 22 mg/cm$^2$ and dried at 130° C. Subsequently, the resulting aluminum foil was subjected to roll-pressing to prepare a positive electrode 2.

[Evaluation of Electrodes]

(1) Binding Property

For the electrodes obtained as described above, a binding property was evaluated. In the evaluation of the binding property, each of the electrodes obtained as described above was bent through 180° and returned in a state where the coating surface thereof was located on the outside. Subsequently, the degree of detachment of the active material on the coating surface (the ratio of the area of a detached portion to the total area) was determined by visual observation and evaluated in accordance with the following criteria. Table 2 shows the evaluation results.

5 points: No detachment is observed.

4 points: Detachment is observed in an amount of 25% or less.

3 points: Detachment is observed in an amount of more than 25% and 50% or less.

2 points: Detachment is observed in an amount of more than 50% and 75% or less.

1 point: Detachment is observed in an amount of more than 75% (to 100%).

(2) State of Electrode Surface

For the electrodes obtained as described above, the state of the electrode surface was evaluated. The presence or absence of spots, projections, and streaks was determined by visual observation, and the evaluation was conducted in accordance with the following criteria. Table 2 shows the evaluation results.

A: Neither a spot, nor a projection, nor a streak is observed.

B: At least one of a spot, a projection, and a streak is observed.

The results are as shown in Table 2. Each of Examples 6 to 11 exhibited both a good electrode surface state and a good binding property, in which a carboxymethyl cellulose salt, whose 1 mass % aqueous solution had a viscosity of 5,000 to 20,000 mPa·s and which had an amount of microgel of 0.100% by mass or less, was used as a binding agent for an electrode. In contrast, in Comparative Example 5, since a carboxymethyl cellulose salt whose 1 mass % aqueous solution had a low viscosity and which contained a large amount of microgel was used, defects were observed on the electrode surface, and the binding property was also poor. In Comparative Example 6, since a carboxymethyl cellulose salt having a small amount of microgel was used, the state of the electrode surface was good. However, the binding property was poor because the 1 mass % aqueous solution had a low viscosity. On the other hand, in each of Comparative Examples 7 and 8, although the binding property was good, defects were observed on the electrode surface because a carboxymethyl cellulose salt containing a large amount of microgel was used.

TABLE 2

| | Active material | Binding agent | Binding property | State of electrode surface |
|---|---|---|---|---|
| Example 6 | Negative electrode 1 | Spherical natural graphite | Example 1 | 5 | A |
| Example 7 | Negative electrode 2 | Spherical natural graphite | Example 2 | 5 | A |
| Example 8 | Negative electrode 3 | Spherical natural graphite | Example 3 | 5 | A |
| Example 9 | Negative electrode 4 | Spherical natural graphite | Example 4 | 5 | A |
| Example 10 | Negative electrode 5 | Spherical natural graphite | Example 5 | 5 | A |
| Comparative Example 5 | Negative electrode 6 | Spherical natural graphite | Comparative Example 1 | 4 | B |
| Comparative Example 6 | Negative electrode 7 | Spherical natural graphite | Comparative Example 2 | 4 | A |
| Comparative Example 7 | Negative electrode 8 | Spherical natural graphite | Comparative Example 3 | 5 | B |
| Comparative Example 8 | Negative electrode 9 | Spherical natural graphite | Comparative Example 4 | 5 | B |
| Example 11 | Positive electrode 2 | LiMn$_2$O$_4$ | Example 1 | 5 | A |

[Preparation of Lithium Secondary Battery]

The negative electrodes and the positive electrodes obtained as described above were combined as shown in Table 3 below. The negative electrode and the positive electrode were stacked with a polyolefin-based (PE/PP) separator, which served as a separator, therebetween. A positive electrode terminal and a negative electrode terminal were connected to the positive electrode and the negative electrode, respectively, by ultrasonic welding. The resulting stacked body was put in an aluminum laminate package, and the package was heat-sealed so as to leave an opening for liquid injection. Thus, a battery before liquid injection, the battery having a positive electrode area of 18 cm$^2$ and a negative electrode area of 19.8 cm$^2$, was prepared. Next, an electrolyte solution in which LiPF$_6$ (1.0 mol/L) was dissolved in a mixed solvent of ethylene carbonate and diethyl carbonate (30/70 volume ratio) was injected, and the opening was heat-sealed. Thus, evaluation batteries 1 to 10 of Examples 12 to 17 and Comparative Examples 9 to 12 were obtained.

[Evaluation of battery performance]

For the lithium secondary batteries prepared as described above, a performance test at 20° C. was conducted. The test method is described below. Table 3 shows the test results.

(1) Cell Impedance

A resistance at a frequency of 1 kHz was measured with an impedance analyzer (available from ZAHNER Company).

(2) 1C Discharge Capacity Retention

In an environment at 20° C., the prepared battery was subjected to CC (constant-current) charging up to 4.2 V at a current density corresponding to 1 C. Furthermore, the charging was switched to CV (constant-voltage) charging at 4.2 V, and the battery was charged for 1.5 hours and then subjected to CC discharging down to 2.7 V at a current density corresponding to 1 C. This operation was repeated 300 cycles. The 1 C discharge capacity at the 300th cycle when the 1 C discharge capacity at the first cycle was assumed to be 100% was calculated and defined as a 1 C discharge capacity retention.

(3) High-Output Capacity Retention

In an environment at 20° C., the prepared battery was subjected to CC (constant-current) charging up to 4.2 V at a current density corresponding to 1 C. Furthermore, the charging was switched to CV (constant-voltage) charging at 4.2 V, and the battery was charged for 1.5 hours. The battery was then subjected to CC discharging down to 2.7 V at a current density corresponding to 0.2 C, and the discharge capacity was measured. In addition, the same operation was conducted except that the current density during the CC discharging was changed to a current density corresponding to 5 C. The 5 C discharge capacity when the 0.2 C discharge capacity was assumed to be 100% was defined as a high-output capacity retention (%).

As shown in Table 3, each of Examples 12 to 17 exhibited a good capacity retention of the battery and a good capacity of the battery at high output while suppressing the cell impedance to be low, in which a carboxymethyl cellulose salt, whose 1 mass % aqueous solution had a viscosity of 5,000 to 20,000 mPa·s and which had an amount of microgel of 0.100% by mass or less, was used as a binding agent for an electrode. Considering the evaluation results of the electrodes in Table 2 above, according to this embodiment, the capacity retention of batteries and the capacity of the batteries at high output could be improved while defects, such as pinholes, on the surfaces of the electrodes were reduced.

In contrast, in Comparative Example 9, since a carboxymethyl cellulose salt whose 1 mass % aqueous solution had a low viscosity and which contained a large amount of microgel was used, the battery had a low capacity retention, a poor capacity at high output, and a high cell impedance. In Comparative Example 10, since a carboxymethyl cellulose salt which had a small amount of microgel but whose 1 mass % aqueous solution had a low viscosity was used, the battery had a poor capacity retention and a high cell impedance. In each of Comparative Examples 11 and 12, a carboxymethyl cellulose salt whose 1 mass % aqueous solution had a high viscosity but which contained a large amount of microgel was used. Accordingly, the battery had a high cell impedance, and the capacity retention of the battery and the capacity of the battery at high output were inferior to those of the batteries of Examples.

INDUSTRIAL APPLICABILITY

A carboxymethyl cellulose or a salt thereof obtained by the production method of the present invention can be used as, for example, a binding (bonding) agent, a dispersing agent, and a thickener in various applications. In an embodiment, the carboxymethyl cellulose or the salt thereof can be suitably used as a binding agent for an electrode of a nonaqueous electrolyte secondary battery such as a lithium secondary battery.

The invention claimed is:

1. A method for producing a carboxymethyl cellulose or a salt thereof, the method comprising:
   (i) reacting cellulose and an alkali for 60 to 120 minutes, at a pH of at least 9, at 5 to 25° C. and in the presence of a mixed solvent comprising water and an organic solvent, to form an alkali cellulose;
   (ii) reacting the alkali cellulose and an etherifying agent, to obtain a reaction mixture;
   (iii) washing and drying the reaction mixture, to obtain a purified product; and
   (iv) pulverizing the purified product,
   wherein (iii) comprises:
   adjusting the pH of the reaction mixture, to obtain a pH in a range of 9 to 11;
   removing the mixed solvent from the reaction mixture, and
   washing and drying the reaction mixture, to obtain a purified product.

2. The method of claim 1, wherein the alkali is present in a range of 0.8 to 1.5 moles relative to 100 g of water.

3. A binding agent comprising the carboxymethyl cellulose or the salt thereof obtained by the method of claim 1.

4. A binding agent comprising a carboxymethyl cellulose or a salt thereof, wherein:
   (1) an aqueous solution comprising water and 1 mass % of the carboxymethyl cellulose or the salt thereof has a viscosity in a range of 5,000 to 20,000 mPa·s at 25° C., and
   (2) a residue of an aqueous solution comprising water and 0.05 mass % of the carboxymethyl cellulose or the salt thereof has, after filtration through a 200-mesh polyester screen under a reduced pressure of −13.3 kPa, a

TABLE 3

| | | Negative electrode | Positive electrode | Cell impedance (mΩ/1 kHz) | 1 C discharge capacity retention (%) | High-output capacity retention (%) |
|---|---|---|---|---|---|---|
| Example 12 | Battery 1 | Negative electrode 1 | Positive electrode 1 | 195 | 94.9 | 64 |
| Example 13 | Battery 2 | Negative electrode 2 | Positive electrode 1 | 211 | 92.9 | 63 |
| Example 14 | Battery 3 | Negative electrode 3 | Positive electrode 1 | 187 | 97.0 | 65 |
| Example 15 | Battery 4 | Negative electrode 4 | Positive electrode 1 | 209 | 93.2 | 61 |
| Example 16 | Battery 5 | Negative electrode 5 | Positive electrode 1 | 209 | 93.0 | 63 |
| Example 17 | Battery 6 | Negative electrode 1 | Positive electrode 2 | 198 | 94.8 | 66 |
| Comparative Example 9 | Battery 7 | Negative electrode 6 | Positive electrode 1 | 248 | 87.2 | 55 |
| Comparative Example 10 | Battery 8 | Negative electrode 7 | Positive electrode 1 | 233 | 83.5 | 60 |
| Comparative Example 11 | Battery 9 | Negative electrode 8 | Positive electrode 1 | 245 | 87.9 | 56 |
| Comparative Example 12 | Battery 10 | Negative electrode 9 | Positive electrode 1 | 248 | 87.1 | 55 | dry mass that is 0.100 mass % or less of a dry mass of the carboxymethyl cellulose or the salt thereof.

5. The binding agent of claim 4, wherein the carboxymethyl cellulose or the salt thereof has a degree of etherification in a range of 0.5 to 0.9.

6. An electrode comprising the binding agent of claim 4.

7. A battery comprising the electrode of claim 6.

* * * * *